United States Patent [19]
Sakalay

[11] 3,824,567

[45] July 16, 1974

[54] MAGNETIC DOMAIN CODE REPEATER

[75] Inventor: Fred E. Sakalay, Poughkeepsie, N.Y.

[73] Assignee: International Business Machines Corporation, Armonk, N.Y.

[22] Filed: Nov. 17, 1972

[21] Appl. No.: 307,760

[52] U.S. Cl. .................... 340/174 TF, 340/174 SR

[51] Int. Cl. ....................... G11c 11/14, G11c 19/00

[58] Field of Search ................. 340/174 TF, 174 SR

[56] References Cited

UNITED STATES PATENTS

| | | | |
|---|---|---|---|
| 3,680,067 | 7/1972 | Chow | 340/174 TF |
| 3,736,577 | 5/1973 | Chang | 340/174 TF |
| 3,763,477 | 10/1973 | Caron | 340/174 TF |
| 3,770,895 | 11/1973 | Krupp et al. | 340/174 TF |

OTHER PUBLICATIONS

IBM Tech. Disc. Bull. "Angelfish Logical Connectives for Bubble Domains" by Almasi et al., Vol. 13, No. 10, 3/71, pp. 2992, 2993.

IBM Tech. Disc. Bull. "Read/Write Control" by Walker, Vol. 13, No. 11, 4/71, pages 3474–3475.

*Primary Examiner*—Stanley M. Urynowicz, Jr.
*Attorney, Agent, or Firm*—Robert J. Haase

[57] ABSTRACT

A magnetic domain (bubble) device which receives a coded train (1's and 0's) of input magnetic bubbles and continuously regenerates identically coded trains of output magnetic bubbles until reset. A first magnetic bubble propagation pathway of permalloy T and I bars is provided for directing the input coded bubbles through a bubble interaction region. A second propagation pathway is provided for directing a continuous series of locally generated magnetic bubbles through the same interaction region. The input bubbles propagate to an output terminal when interaction occurs. The locally generated bubbles are directed to a bubble annihilator in the absence of interaction and are diverted to an alternate propagation pathway merging with the first pathway in the presence of interaction. The input bubbles and the diverted locally generated bubbles are timed to reach the interaction region along the first propagation pathway simultaneously with the arrival of respective locally generated bubbles to the interaction region along the second propagation pathway. The bubble capacity of the alternate pathway is made equal to the number of the code positions in the input bubble train. Provision is made for selectively intercepting a number of locally generated magnetic bubbles equal to said number of code positions for terminating the regeneration of the input coded train.

9 Claims, 1 Drawing Figure

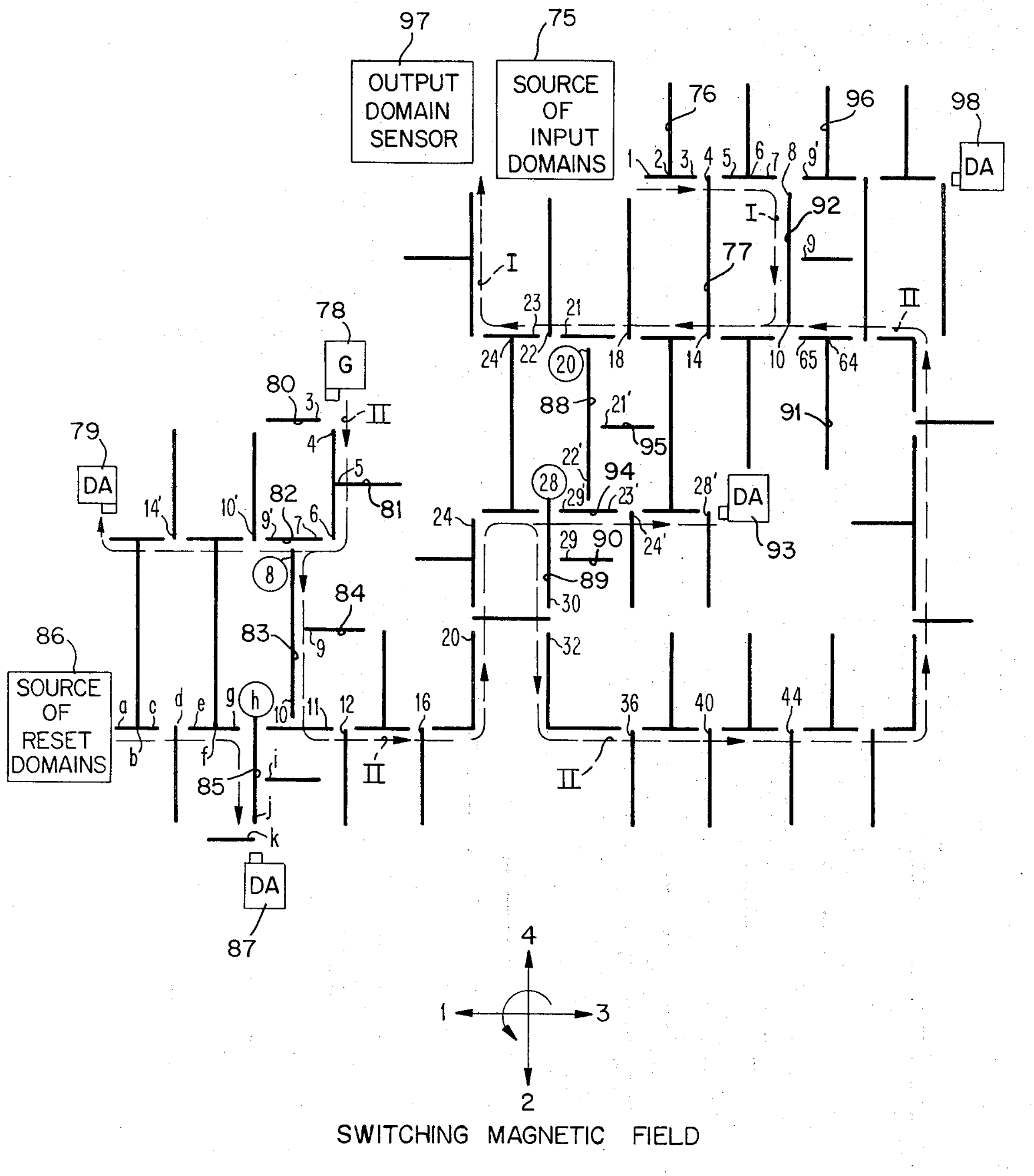
OUTPUT DOMAIN SENSOR
SOURCE OF INPUT DOMAINS
SOURCE OF RESET DOMAINS
DA
G
SWITCHING MAGNETIC FIELD

MAGNETIC DOMAIN CODE REPEATER

BACKGROUND OF THE INVENTION

1. Field of the Invention

The present invention generally relates to magnetic domain devices and, more particularly, to apparatus for receiving an input coded train of magnetic bubbles and continuously regenerating the input coded train until reset.

2. Description of the Prior Art

In data processing systems, there is a need for devices for generating coded signals for system control purposes. The specific manner in which the signals are coded necessarily varies from time to time depending upon the control function being executed. However, a given specific code often is used repeatedly before a new specific code is generated.

Magnetic domain devices are well known to facilitate the design of high speed and high density computer system devices. It is desired, therefore, to provide a magnetic domain device which performs the function of a data processing system code generator, the code generator being adapted to receive an input coded signal (binary 1's being represented by the presence of respective magnetic domains) and operative to produce a recurring series of identically coded signals until reset. The generator, in effect, is a writable data storage device which may be sensed non-destructively.

SUMMARY OF THE INVENTION

A magnetic domain code repeater adapted to receive an input coded train of magnetic (bubbles) that continuously regenerates a series of identically coded bubbles until reset. The input bubbles propagate along a first pathway through a domain interaction region to an output terminal. Locally generated bubbles propagate through the same interaction region along a second pathway which merges with the first pathway. Each locally generated bubble is intercepted by a domain annihilator if there is no interaction with a respective input bubble at the interaction region. If interaction occurs, the locally generated bubble continues to propagate along the second pathway to the first pathway and through the interaction region to the output terminal. In effect, each time that a bubble passes through the interaction region along the first pathway, it initiates a replica locally generated bubble which, in turn, subsequently initiates another replica locally generated bubble in the same manner, and so on. The production of replica bubbles is terminated by intercepting the locally generated bubbles before they reach the interaction region for a period of time sufficient to allow the last bubble to traverse the interaction region along the first pathway.

BRIEF DESCRIPTION OF THE DRAWING

The sole FIGURE is a schematic representation of a preferred embodiment of the present invention utilizing T and I bar permalloy pathways for propagating magnetic domains.

DESCRIPTION OF THE PREFERRED EMBODIMENT

As is well understood, magnetic domain devices conventionally employ permeable T and I bar overlay patterns on a ferro-magnetic cylindrical domainsupporting film for defining domain propagation pathways. A bias magnetic field is applied perpendicular to the film and a switching magnetic field is provided having a switchable direction within the plane of the film for maintaining and for propagating, respectively, the cylindrical magnetic domains. Referring to FIG. 1, conventional means (not shown) are provided for applying a bias magnetic field perpendicular to the plane of the drawing and for generating a switching magnetic field represented by the mutually perpendicular arrows designated 1, 2, 3 and 4. The direction of the in-plane magnetic field switches in the counterclockwise sequence of the reference numerals as is well understood. A source of input magnetic bubbles 75 is capable of supplying one bubble for each complete rotation of the in-plane switching magnetic field. Thus, when the switching field is in the direction represented by arrow 1, an input bubble (if present) appears at position 1 of T bar 76. As a matter of convention, the presence of a bubble at position 1 represents the binary datum one whereas the absence of a bubble at position 1 represents the binary datum zero.

A bubble at position 1 of T bar 76 successively occupies the positions 2 and 3 of T bar 76 and position 4 of I bar 77 in response to the successive changes in the direction of the in-plane switching magnetic field represented by the arrows 2, 3 and 4. When the first input bubble reaches position 4 of I bar 77, a second input bubble is supplied by source 75 and occupies position 1 of T bar 76 assuming that the second datum of the input coded train of magnetic domains also is a one. Thus, a coded train of input bubbles appear at the output of source 75 and successively occupy respective positions 1, 2, 3, 4, 5, 6, 7, 8, 9, 10, 11 . . . 20 along propagation pathway I. Position 20 along propagation pathway I is in a magnetic domain interaction region wherein a bubble at position 20 along pathway I will interact with another bubble at position 28 along pathway II. Domain generator 78 provides a continuous stream of locally generated bubbles which propagate along pathway II unless they are intercepted by domain annihilator 79.

Bubbles provided by generator 78 occupy position 3 of I bar 80 and positions 4, 5 and 6 of T bar 81 when the directions of the in-plane switching magnetic field are as indicated by the correspondingly numbered arrows. A bubble from generator 78 reaching position 8 of I bar 83 normally continues to position 9 of I bar 84 unless a bubble is present at position h of I bar 85. A source of reset bubbles 86 selectively provides output bubbles which propagate along positions *a, b, c, d . . . h, i, j, k* and are consumed in domain annihilator 87. If a reset bubble is present at position *h* of I bar 85 when a bubble from generator 78 is at position 8 of I bar 83, the bubble at position 8 is diverted to position 9' of I bar 82 and, then, to domain annihilator 79 in due course as the direction of the in-plane magnetic field continues to rotate.

Assuming for the moment that no reset bubbles are provided by source 86, each bubble from generator 78 upon reaching position 8 of I bar 83 continues to position 9 of I bar 84 and, eventually, reaches position 28 along propagation path II. If an input bubble is present at position 20 of I bar 88 when a bubble reaches position 28 of I bar 89, the bubble at position 28 is urged to position 29 of I bar 90 and then continues along propagation pathway II to position 65 of T bar 91. The next 90° rotation of the in-plane switching magnetic field causes a bubble at position 65 of T bar 91 to move to position 10 of I bar 92 which lies along propagation pathway I. Subsequent rotation of the switching magnetic field causes the domain to continue on to position 20 at the interaction region along pathway I.

It will be recalled that the first bubble from source 75 upon reaching position 20 of I bar 88 initiated a first locally generated bubble at position 28 of I bar 89 by causing it to propagate along pathway II. Then, the initiated bubble was routed to pathway I and reached position 20 of I bar 88. In effect, the first input bubble upon reaching position 20 causes the initiation of a replica bubble which, in turn, upon reaching position 20 causes the initiation of a second replica bubble and so on until reset, as will be explained later. Each time that an input bubble or a replica bubble reaches position 20 of I bar 88 simultaneously with a locally generated bubble at position 28 of I bar 89, the bubble at position 20 continues along pathway I to positions 21 . . . 24 leading to output domain sensor 97 in response to subsequent rotational stepping of the in-plane switching magnetic field.

It should be noted that the length of propagation pathway II between position 28 of I bar 89 and position 20 of I bar 88 is such that 12 separate magnetic bubbles from generator 78 may be accommodated simultaneously. Of course, the pathway length may be increased or decreased to accommodate a greater or lesser number of bubbles from generator 78. In the example given wherein a maximum of 12 bubbles may be present simultaneously, the first initiated locally generated bubble reaches position 20 of I bar 88 along pathway I immediately following the passing of the twelfth input bubble from source 75 through the same position 20. Thus, the embodiment depicted in the sole figure is adapted to receive a coded train of 12 input magnetic bubbles and is operative to regenerate a continuous series of 12 identically coded locally generated bubbles until reset. Each bubble in each corresponding series of twelve bubbles from generator 78 will be coded identically as the respective bubble in the series of 12 input bubbles from source 75. For example, if the first input datum position represents a binary 1 (the corresponding bubble is present), the first bubble from each locally generated train will subsequently appear at position 20 of I bar 88. If the second input datum position represents a binary zero (the corresponding bubble is not present), the second bubble from each locally generated train will be intercepted by domain annihilator 93 before it can reach position 20 of I bar 88.

The interception of a locally generated bubble by annihilator 93 each time that a binary zero is at position 20 of I bar 88 occurs as follows. When a locally generated bubble reaches position 28 of I bar 89 at the same time that no bubble appears at position 20 of I bar 88, the locally generated bubble proceeds to favored position 29' of I bar 94 whereupon it continues through positions 22', 23', 24' . . . 28', and annihilator 93 in response to the continued rotation of the in-plane switching magnetic field. The annihilation of a locally generated bubble precludes the subsequent appearance of a bubble at position 20 of I bar 88 during the time slot simultaneous with each additional twelve complete rotations of in-plane switching magnetic field.

The regeneration of the coded input magnetic bubbles may be terminated by supplying a number of bubbles from source 86 equal to or greater than the maximum number of bubbles that can be present between position 28 along pathway II and position 20 along pathway I. In terms of the disclosed embodiment, at least twelve successive bubbles are provided by source 86 synchronously with a corresponding number of rotations of the in-plane switching magnetic field to completely clear propagation pathway II of all locally generated domains that might be present between positions 28 and 20. The cleared apparatus is ready for the reception of a new series of twelve input magnetic bubbles which may be coded in any manner independent of the first series of twelve input bubbles.

Special provision is made in the disclosed preferred embodiment to preclude spurious bubbles that might propagate along pathway I from reaching the output domain sensor. In the absence of a locally generated bubble at position 28, a bubble at position 20 would leave pathway I to favored position 21' of I bar 95 and toward domain annihilator 93. Any bubble which reaches position 8 along pathway I at the same time that a locally generated bubble reaches position 64 along pathway II is deflected to position 9' of T bar 96 and toward domain annihilator 98.

It will be noted that although the disclosed embodiment of the present invention operates as a code repeater, it readily functions also as a set-reset latch. For example, if a single input bubble is provided by source 75, a continuous series of locally generated bubbles will be directed to domain sensor 97 (latch is set) until reset by a number of bubbles from generator 78 equal to the population of locally generated bubbles that may be present between position 28 of I bar 89 and position 20 of I bar 88.

While this invention has been particularly described with reference to the preferred embodiments thereof, it will be understood by those skilled in the art that the foregoing and other changes in form and details may be made therein without departing from the spirit and scope of the invention.

What is claimed is:

1. A magnetic domain device comprising:

a first domain propagation pathway passing through a domain interaction region, an input domain source coupled to one end of said first pathway, a second domain propagation pathway passing through said domain interaction region, a source of locally generated domains coupled to one end of said second pathway, the other end of said second pathway merging with said first pathway at a first location between said one end of said first propagation pathway and said interaction region, and an output domain sensor, the other end of said first pathway being coupled to said sensor.

2. The device defined in claim 1 and further including:

a first bubble annihilator coupled to said second pathway at said interaction region, each said locally generated domain being directed to said annihilator in the absence of interaction with a respective domain propagating through said interaction region along said first pathway.

3. The device defined in claim 1 and further including:

a second bubble annihilator coupled to said second pathway at a second location between said source of locally generated domains and said interaction region, and a selectively operative source of reset domains, said reset domains interacting with said locally generated domains when said locally generated domains are at said second location, said locally generated domains being directed to said second annihilator when said reset domains interact with said locally generated domains.

4. The device defined in claim 3 wherein:

said source of reset domains when operative produces a number of reset domains equal to the bubble population of said second pathway from said interaction region to said first location plus the bubble population of said first pathway from said first location to said interaction region.

5. The device defined in claim 1 wherein said input domain source provides a coded train of input magnetic bubbles.

6. The device defined in claim 5 wherein the bubble capacity of said second pathway from said interaction region to said first location plus the bubble capacity of said first pathway from said first location to said interaction region numerically is equal to the maximum number of bubbles in said coded train of input magnetic bubbles.

7. The device defined in claim 5 and further including:

a second bubble annihilator coupled to said second pathway at a second location between said source of locally generated domains and said interaction region, and a selectively operative source of reset domains, said reset domains interacting with said locally generated domains when said locally generated domains are at said second location, said locally generated domains being directed to said second annihilator when said reset domains interact with said locally generated domains.

8. The device defined in claim 7 wherein said source of reset domains when operative produces a number of reset domains equal to the bubble population of said second pathway from said interaction region to said first location plus the bubble population of said first pathway from said first location to said interaction region.

9. The device defined in claim 7 wherein said source of reset domains when operative produces a number of reset domains equal to the maximum number of bubbles in said coded train of input magnetic bubbles.

* * * * *